Jan. 27, 1970  R. K. PATTERSON, JR., ET AL  3,492,558
WINDSHIELD WIPER CONTROL SYSTEM
Filed Oct. 21, 1966

INVENTORS
RICHARD K. PATTERSON JR.
GERALD L. RODGERS
BY Yount, Raney, Flynn, & Tarolli
ATTORNEYS

United States Patent Office 3,492,558
Patented Jan. 27, 1970

3,492,558
WINDSHIELD WIPER CONTROL SYSTEM
Richard K. Patterson, Jr., and Gerald L. Rodgers, Worthington, Ohio, assignors to Ranco Incorporated, Columbus, Ohio, a corporation of Ohio
Filed Oct. 21, 1966, Ser. No. 588,386
Int. Cl. H02p 1/18
U.S. Cl. 318—443                         7 Claims

ABSTRACT OF THE DISCLOSURE

A windshield wiper control system includes a semiconductor switch having an output circuit completed through control switches one of which is a windshield wiper control switch, to energize a device for operating a windshield wiper control drive. A timing circuit is connected to an input circuit of the semiconductor switch to produce an adjustable delay between cycles of the windshield wiper. The timing circuit is arranged to permit immediate operation of the windshield wiper when the windshield wiper control switch is closed. A reset circuit is provided to reset the timing circuit at the end of each windshield wiper cycle.

BACKGROUND OF THE INVENTION

Field of the invention

Figure 1:
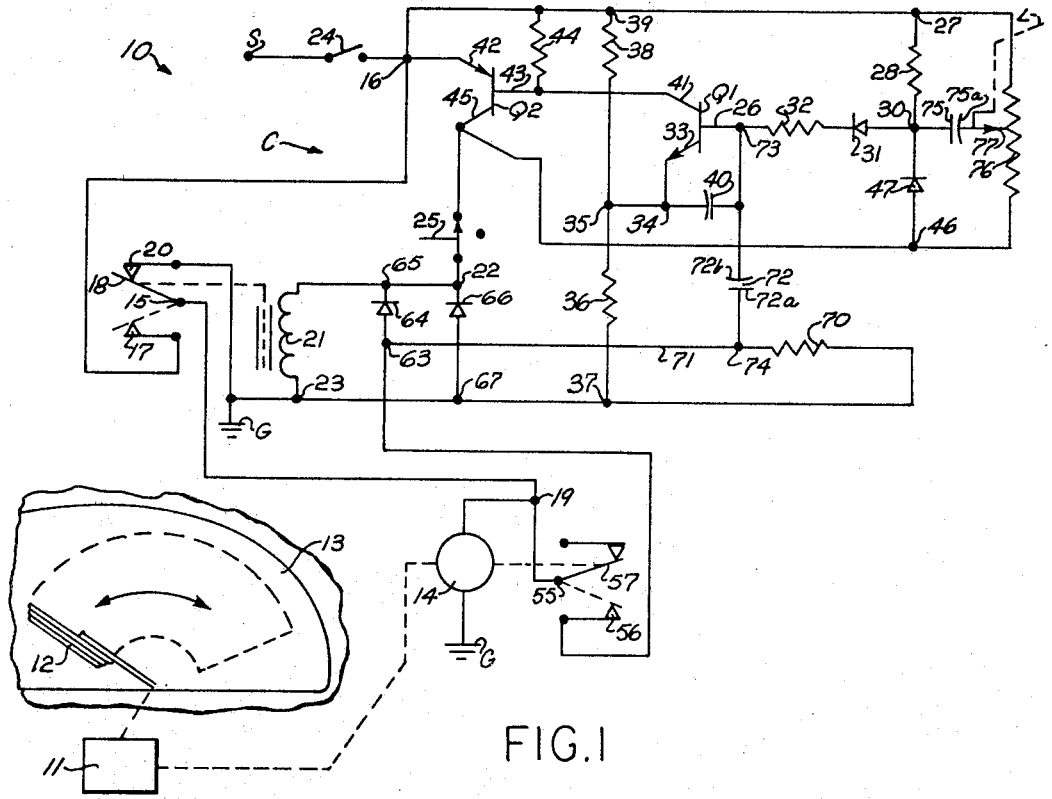

The present invention relates to circuitry for performing a control function such as initiating the actuation of a servomechanism in response to the occurrence of an event and more particularly relates to control circuitry operable to delay the control function for a predetermined time after the occurrence of an event, and which is suitable for use in conjunction with an automotive windshield wiper or the like.

The prior art

In certain previously known control circuits of the type referred to, the circuit elements for providing a delay between cycles of the servomechanism have caused a delay between initial turning on of the circuit and operation of the servomechanism. When used in conjunction with certain servomechanisms, such as the windshield wiper of an automotive vehicle, the delay between turning the windshield wiper "on" and operation of the wiper blades is often of such duration that visibility from the vehicle may be seriously impaired by accumulation of matter on the windshield prior to the initial sweep of the wiper blades. Moreover, these prior art control circuits have included relatively complex and expensive components and have therefore been correspondingly expensive to manufacture.

SUMMARY OF THE INVENTION

The present invention provides a new windshield wiper control system for intermittently operating wiper blades. The new system is constructed and arranged so that the wiper blade immediately cycles when the windshield wiper control switch is operated to turn on the windshield wiper. Thereafter the system effects operation of the blades intermittently at controllable intervals.

The system utilizes a semiconductor switch which conducts to energize an actuator associated with the drive for the windshield wiper blade and a charging circuit for conditioning the semiconductor switch to the conductive state. The charging circuit includes a capacitor and fixed resistor connected to an input circuit of the semiconductor switch. A small variable resistor is connected to the capacitor to vary the charging time of the capacitor and thus control the interval between cycles. A reset circuit effects discharging of the capacitor at the end of each cycle.

The reset circuit comprises a second capacitor and a switch which is cyclically operated. The second capacitor provides for maintenance of a particular voltage level in the input circuit during a cycle and abruptly changes this voltage level to render the semiconductor switch nonconducting when the cyclic switch operates.

Accordingly, a principal object of the present invention is the provision of a new and improved control circuit adapted to be associated with a windshield wiper of an automotive vehicle or the like which is simple in construction, relatively inexpensively manufactured and yet is effective to provide relatively long adjustable delays between sweeps of wiper blades of the windshield wiper.

Another object of the present invention is the provision of a new and improved windshield wiper, for an automotive vehicle or the like, including a control circuit operative to provide a variable delay between sweeps of the wiper blades across the windshield of the vehicle and which is effective to provide an initial sweep of the wiper blades immediately after the windshield wiper has been turned on by an occupant of the vehicle.

Another object of the present invention is the provision of a new and improved control circuit for a servomechanism or the like including switching amplifier means which is turned on to effect energization of the servomechanism, reset circuit means coupled to the input of the amplifier means for turning off the amplifier means upon the occurrence of an event and timing circuit means for maintaining the amplifier means turned off for a predetermined time after occurrence of the event.

Another object of the present invention is the provision of a new and improved control circuit as set forth in the next preceding paragraph and wherein the timing circuit means includes a pair of resistance elements and a capacitance element with one of the resistance elements adjustable so that a regulatable and relatively long delay between occurrence of the event and turning on of the amplifier means is provided.

Yet another object of the present invention is the provision of a new and improved circuit which is effective to provide a delayed output voltage in response to the occurrence of an event including switching means operable between a non-conductive condition and a conductive condition wherein the current pulse is provided, and timing circuit means for rendering the switching means conductive a predetermined time after occurrence of the event, and wherein the timing circuit means includes a capacitance element effective at a predetermined charge condition thereof to render the switching means conductive, a resistance element cooperating with the capacitance element to provide a predetermined charging rate therefor, and means for adjustably varying the amount of charge on the capacitance element necessary to render the switching means conductive to thereby control the extent of the aforementioned delay.

Figure 2:
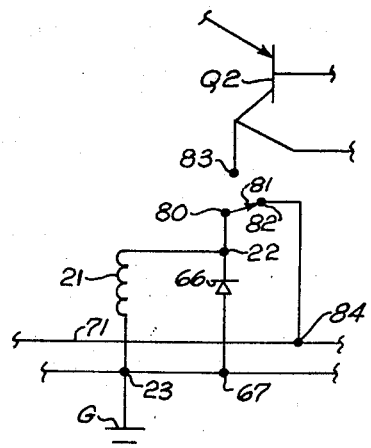

Other objects and advantages of the present invention will become apparent from the following detailed description thereof and from the accompanying drawings which form a part of this specification and in which:

FIG. 1 is a schematic illustration of a control circuit embodying the present invention operatively related with a windshield wiper circuit; and FIG. 2 is a fragmentary view of a modification of a portion of a control circuit of FIG. 1.

The present invention provides an improved control circuit which is effective to initiate or control operation of a servomechanism associated therewith a predetermined time after energization of the control circuit. A control circuit embodying the present invention may be used in conjunction with any mechanism adapted to be intermittently operated, or operated a predetermined time after the occurrence of a given event. However, a control circuit embodying the present invention is disclosed herein as utilized in conjunction with a windshield wiper drive mechanism and is shown and described in reference to such a use.

A windshield wiper 10 embodying the present invention is illustrated in FIG. 1. The windshield wiper 10 includes a windshield wiper mechanism 11 which is operable to move a windshield wiper blade 12 along a reciprocating path across a windshield 13 of an automotive vehicle or the like. The mechanism 11 is driven by a direct current electric motor 14, preferably of the permanent magnet type, having an energization circuit connectable with a source S of direct current power, such as a 12 volt battery, and a ground G. When the windshield wiper 10 is in its operative condition, energization of the motor 14 is controlled by relay contacts 15 which close and interrupt the energization circuit for the motor 14 in response to operation of a control circuit, generally designated as C. The control circuit C effects energization of the motor 14 in an intermittent manner and includes switching amplifier means operable to energize a relay coil 21 which actuates the relay contacts 15.

More specifically, the energization circuit for the motor 14 includes the source S, a manual switch 24, a junction 16, the relay contacts 15 which include a fixed contact 17 and a movable contact 18, a junction 19 connected to one terminal of the motor, the other terminal of which is connected to ground G. The relay contacts 15 are normally positioned with the contact 18 engaging a fixed contact 20 which is connected with the ground G. The contact 18 is actuated to move from the contact 20 to the contact 17 in response to energization of the relay coil 21 connected in the emitter-collector circuit of a PNP transistor Q2 which forms part of the aforementioned amplifier means. The energization circuit for the relay coil 21 may be traced from the source S through the switch 24, the junction 16, the emitter-collector circuit of the transistor Q2, a control switch 25, a junction 22, the relay coil 21 and to ground. The switch 24 may be the ignition circuit control switch or a switch operated by the ignition switch for the vehicle engine, not shown, and the switch 25 may be a conventional on-off switch conveniently located on the instrument panel of the automobile.

The switching amplifier means includes the transistor Q2 and an NPN transistor Q1, which are coupled together in a manner which will be described hereinafter, so that the amplifier means effects operation of the relay contacts 15 to intermittently energize the motor 14 when the switches 24, 25 are closed.

When the switch 24 is closed, a base-emitter circuit of the transistor Q1 is completed from the source S through the switch 24, junction 16, a junction 27, a resistor 28, a junction 30, a diode 31, a resistor 32, the base 26 and emitter 33 of the transistor Q1, junctions 34, 35, a resistor 36 and to ground. The resistor 36 is connected in series with a resistor 38 connected to the source S by a junction 39 and the resistors 36, 38 provide a voltage dividing network which establishes a fixed potential at the emitter of the transistor Q1 when the switch 24 is closed. A capacitor 40 is connected in parallel around the base 26 and emitter 33 of the transistor Q1 and cooperates with the resistor 32 to prevent the transistor from being turned on by circuit transients at undesired times.

When the switch 24 is closed, the voltage at the base of the transistor Q1 becomes positive with respect to the voltage at its emitter, and the transistor starts to turn on thereby establishing a collector-emitter current herein and an emiter-base current in the transistor Q2. The circuit established can be traced from the source S through the switch 24, junction 16, emitter 42 of the transistor Q2, base 43 of the transistor Q2, the collector and emitter of the transistor Q1, junction 35, resistor 36 and to ground.

Conduction in the collector-emitter circuit of the transistor Q1 establishes a voltage drop across a base biasing resistor 44 connected between the source S and the base 43 of the transistor Q2, which voltage drop is effective to establish an emitter-base current in the transistor Q2 since the base 43 thereof is at a lower voltage than the emitter 42. The base biasing resistor 44 functions to stabilize operation of the transistor Q2 at high temperatures as is known.

When the emitter-base circuit of the transistor Q2 conducts, the transistor Q2 starts to turn on establishing an emitter-collector circuit in the transistor Q2. The emitter-collector circuit established may be traced from the source S through the switch 24, the junction 16, the emitter 42 and collector 45 of the transistor Q2, a junction 46, a diode 47, the junction 30, diode 31, resistor 32, base 26 and emitter 33 of the transistor Q1, junctions 34, 35, resistor 36 and the junction 37 at ground. The circuit just described forms a regenerative feedback circuit which provides for a convulsive turning on of the transistors Q1, Q2. It should be apparent from the foregoing, that when the ignition associated switch 24 is closed, the switching amplifier means is fully energized; however, the windshield wiper motor 14 is not energized because switch 25 is open.

When conditions require operation of the windshield wipers, the control switch 25 is closed by the operator of the vehicle, immediately completing the energization circuit for the relay coil 21 through the emitter-collector circuit of the fully turned on transistor Q2 and thereby energizing the motor 14 as described hereinabove. The motor 14 is mechanically linked to a switch 55 having a fixed contact 56 and a moving contact 57 adapted to move to and from the fixed contact in response to operation of the motor. The linkage between the motor 14 and the switch 55 is constructed so that the contacts 56, 57 are closed during each reciprocal stroke of the wiper blade 12 and are opened when the wiper blade is in its "park" or "home" position. The purpose of this switch will become apparent from the following.

Circuitry is provided for adjustably delaying operation of the windshield wiper after completion of each stroke of the wiper blade 12 across the windshield 13. As illustrated in FIG. 1, the circuitry includes circuit means for turning off, or terminating, operation of the switching amplifier means and cooperable timing circuit means for maintaining the switching amplifier means turned off for a predetermined time before turning on thereof.

The termination circuit includes a resistor 70 connected between a junction 63 and ground by a conductor 71, and a capacitor 72 connected between a junction 73 at the base 26 of the transistor Q1 and a junction 74 at the conductor 71. The termination circuit can be traced from the source S through relay contacts 15, the closed contacts 56, 57 of the switch 55, the junction 63, the conductor 71, resistor 70 and to ground. The termination circuit is connected to the source by closing of the contacts 56, 57 of the switch 55 during a stroke of the wiper blade 12 and is disconnected from the source when the blade reaches its park position. Completion of the termination circuit charges the capacitor 72 so that the plate 72a of the capacitor 72 adjacent the junction 74 is positive with respect to the plate 72b thereof connected to the base 26 of the transistor Q1.

When the wiper blade 12 reaches its park position subsequent to a stroke, the contacts 56, 57 of the switch 55 are opened to interrupt the termination circuit which results in a drop in voltage at the junction 74 and the capacitor 72 discharges to ground through the resistor 70. As noted previously, the plate 72a of the capacitor 72 is positive with respect to the plate 72b thereof when the switch 55 is closed. When the switch 55 opens, the potential of the plate 72a decreases toward zero and the potential of the plate 72b decreases accordingly causing the base 26 of the transistor Q1 to become negative with repect to its emitter, thereby turning off the transistors Q1, Q2.

The circuit means for maintaining the transistors Q1, Q2 turned off subsequent to a stroke of the wiper blade 12 includes the resistor 28, a capacitor 75 and a variable resistor 76. The variable resistor 76 is connected in parallel with the series connected resistor 28 and diode 47, and the capacitor 75 is connected between the junction 30 and a slider 77 of the resistor 76. The resistor 76 is constructed to form a voltage divider with the slider 77 providing an adjustable voltage at the plate 75a of the capacitor 75. Thus the setting of the slider 77 is effective to control the level to which the capacitor 75 must be charged to turn on the transistors Q1, Q2 as will be more fully described hereinafter. After the circuit is reset as described, the capacitor 75 is charged from the source S at a rate controlled by the value of the resistor 28 until the potential at the junction 30 is sufficient to again render the transistor Q1 conductive, at which time the transistors Q1, Q2 are turned on to re-energize the coil 21 through the closed contacts of the control switch 25.

The voltage level at junction 30 when the capacitor 75 commences charging is, as previously mentioned, controlled by the setting of the slider 77 of the resistor 76. Accordingly, the slider 77 is movable in response to actuation of a suitable linkage L which is preferably operable by the operator of the vehicle. In the embodiment of the invention illustrated in FIG. 1, when the setting of the slider 77 provides a voltage somewhat greater than the voltage at the junction 34, the relay coil 21 is reenergized immediately after termination of operation of the switching amplifier means to provide continuous operation of the windshield wiper drive 11. With lower voltages at the slider 77, delays of up to 10 seconds between sweeps of the wiper blades are obtainable. When the transistors Q1, Q2 turn on, as described, one side of the capacitor 75 discharges through the base-emitter circuit of the transistor Q1 via the diode 31 and resistor 32 while the other side of the capacitor 75 discharges through the resistor 76 and transistor Q2.

When operation of the windshield wiper 10 is no longer desirable, the switch 25 is manually opened by the operator of the vehicle. If the switch 25 is opened when the wiper blade is in its park position, the energization circuit for the relay coil 21 through the emitter-collector circuit of the transistor Q2 is interrupted so that the amplifier means is ineffective to operate the motor 14 thereafter. If the switch 25 is opened during a stroke of the blade, the emitter-collector circuit of the transistor Q2 is interrupted but a holding circuit is effective to maintain the relay coil 21 energized until the blade reaches its park position. The holding circuit can be traced from the source S through the switch 24, junction 16, contacts 17, 18 of the relay contacts 15, junction 19, contacts 56, 57 of the switch 55, a junction 63, diode 64, a junction 65, the coil 21 and to ground. When the blade 12 approaches its park position, the switch 55 is actuated as described to interrupt the holding circuit and deenergize the relay coil 21 so that the wiper blade 12 comes to rest at the park position out of the line of vision of the occupant of the vehicle. A diode 66 is connected in parallel with the coil 21 to prevent damage to the circuit elements when the coil 21 is de-energized.

De-energization of the relay coil 21 results in closing of the relay contacts 18, 20 associated therewith so that the terminals of the motor 14 are connected to ground G. With the terminals so connected the motor 14 functions as a generator thereby providing dynamic braking of the rotor thereof in a manner which is known. Dynamic braking of the rotor insures that the wiper blade or blades come to rest quickly and in a park position which does not obstruct visibility through the windshield.

FIG. 2 illustrates a modified control switch 80 which may be provided in the circuit of FIG. 1 in place of switch 25 and eliminates the diode 64 in the holding circuit for the coil 21. As shown in FIG. 2, the switch 80 includes a switch arm carrying a moving contact 81 thereon which is alternatively engageable with contacts 82, 83. The contacts 81, 82 are closed when the windshield wipers are not in use and contacts 81, 83 are closed when it is desired to turn on the windshield wiper 10. The switch 80 is connected between the transistor Q2 and the junction 22 in the relay coil energization circuit. The contact 82 of the switch 80 is connected to the conductor 71 at a junction 84.

When it is desired to operate the windshield wiper 10, the switch 80 is actuated by the operator of the vehicle to close the contacts 81, 83 which completes the emitter-collector circuit of the transistor Q2 causing energization of the relay coil 21 as previously described in reference to FIG. 1. In the event that the windshield wiper switch is turned to "off" during a sweep of the blade 12 across the windshield 13, a holding circuit is completed from the conductor 71 through the junction 84, the contacts 81, 82, junction 22 to the relay coil 21 and the junction 23 at ground potential. This holding circuit, of course, is effective to maintain the motor 14 energized until the blade 12 reaches its home, or park, position at which time the contacts 56, 57 of the switch 55 are opened to de-energize the motor and the relay coil 21.

It will be apparent that use of the switch 80 in the windshield wiper 10 eliminates the necessity for the diode 64, shown in FIG. 1, since the holding circuit for the relay coil 21 is maintained through the normally closed contacts 81, 82 of the switch.

Representative values of elements employed in the circuit of FIG. 1 are as follows:

Resistors:
 44 _____ohms__ 10K
 38 _____do____ 470
 36 _____do____ 430
 32 _____do____ 15K
 70 _____do____ 680
 28 _____megohms__ 12
 76 _____ohms pot__ 10K
Capacitors:
 40 _____mf__ 0.47
 75 _____mf__ 1.0
 72 _____mf__ 0.022
Transistors:
 Q1 _____ MPS6515
 Q2 _____ MPS6534
Diodes:
 31 _____ 1N456
 47 _____ 1N456
 66 _____ 1N456
 64 _____ 1N2069

It can now be seen that a new windshield wiper control system for an intermittent windshield wiper has been provided and that the objects heretofore enumerated, and others, have been accomplished.

Having described our invention, we claim:
1. A windshield wiper control system for intermittently effecting operation of a drive mechanism for a wiper blade at controllable intervals comprising:
 (a) an electric power supply;
 (b) an electrically energizable device for initiating operation of the drive mechanism;
 (c) first and second control switches connected across said power supply in series with said device;
 (d) semiconductor switching means having an output circuit in series with said first and second switches and an input circuit in series with one of said switches and in parallel with the other switch;
 (e) said switching means including a semiconductor element having power electrodes between said switches and defining a part of said output circuit;
 (f) said input circuit rendered conductive in response to closing of said one of said switches and operable to condition said semiconductor to a conductive state whereby subsequent closing of said other switch completes an energizing circuit through said output circuit to said device to immediately provide an initial cycle of the drive mechanism; and (g) timing circuitry connected in said input circuit for governing the conductive condition of said input circuit subsequent to the initial cycle of said drive mechanism;

(h) said timing circuitry including elements for preventing said input circuit from rendering the output circuit conductive for a predetermined interval after each cycle and enabling conduction of said output circuit at the end of said interval.

2. The control system defined in claim 1 wherein said timing circuity comprises a fixed resistor and a capacitor connected in series with said resistor, said input circuit connected to a point between said resistor and a plate of said capacitor, said capacitor being charged through said resistor after each cycle of said drive mechanism and the voltage level at said point is controlled by the voltage level at said plate.

3. The control system defined in claim 2 and further including a delay adjusting circuit connected in series between said first and second switches, a second plate of said capacitor connected to a point in said delay adjusting circuit providing a voltage level at said second plate for maintaining said input circuit conductive after closing of said one switch and prior to closing of said other switch.

4. The control system defined in claim 3 wherein said delay adjusting circuitry includes at least an adjustable resistor for producing an adjustable desired voltage at said second plate after said other switch is closed and thereby adjustably controlling the time required to charge said capacitor from said desired voltage to a voltage sufficient to render said input circuit conductive.

5. The control system defined in claim 2 and further including a reset circuit for said timing circuit comprising a second capacitor and having a first plate connected to said input circuit, said second capacitor having a first charge state during conduction of said input circuit, and means for abruptly conditioning said second capacitor to a second charge state in response to the drive mechanism reaching a predetermined point in a cycle, said second capacitor terminating conduction of said input circuit and providing for discharging of said second charge state.

6. The control system defined in claim 5 wherein said means for conditioning said second capacitor to said second charge state includes a drive mechanism position responsive switch connected in circuit to a second plate of said second capacitor, said position responsive switch having a first position for establishing a first voltage level at said second plate during conduction of said input circuit and said position responsive switch operated to a second position to abruptly change the voltage level at said second plate to condition said capacitor to said second charge state.

7. In a control circuit for intermittently cycling a servomechanism comprising:

(a) a control switch actuable to render said control circuit operative;

(b) voltage responsive switching means operated to a conductive condition for establishing conduction through said control switch to initiate operation of said servomechanism and a nonconductive condition;

(c) timing circuitry for controlling conduction of said voltage responsive switch;

(d) said timing circuitry comprising a first circuit having a fixed resistance and a capacitor connected in series, said capacitor charged through said resistance to establish said signal voltage level at a point between said resistor and said capacitor, said point, connected to a control electrode of said voltage responsive switch and effective to establish a signal voltage level at said control electrode which varies as a particular function of time consistently from cycle to cycle;

(e) a second circuit having a variable resistance element connected to said capacitor for establishing a desired initial signal voltage level at said control electrode;

(f) said voltage responsive switching means rendered conductive when a predetermined signal voltage level exists at said control electrode, said variable resistance controlling the time required for said predetermined level to the established; and (g) terminating circuit means for rendering said voltage responsive switch nonconductive including a second capacitor having a first charge condition enabling conduction of said voltage responsive switch and means for operating said capacitor to a second charge condition in which said signal voltage level is altered to render said voltage responsive switch nonconductive.

References Cited

UNITED STATES PATENTS 3,262,042   7/1966   Amos _____ 318—443
3,411,021   11/1968  Elich _____ 307—293 XR B. BOBECK, Primary Examiner R. J. HICKEY, Assistant Examiner U.S. Cl. X.R.
307—293